(12) United States Patent
Koushik et al.

(10) Patent No.: US 12,041,044 B2
(45) Date of Patent: Jul. 16, 2024

(54) SERVER NODE-CONTROLLED ADVERTISEMENT

(71) Applicant: Dell Products, L.P., Round Rock, TX (US)

(72) Inventors: Bharath Koushik, Bangalore (IN); Faizal SN, Bangalore (IN); Santosh Gore, Bangalore (IN); Ramesha He, Bangalore (IN)

(73) Assignee: DELL PRODUCTS, L.P., Round Rock, TX (US)

( * ) Notice: Subject to any disclaimer, the term of this patent is extended or adjusted under 35 U.S.C. 154(b) by 337 days.

(21) Appl. No.: 17/566,808

(22) Filed: Dec. 31, 2021

(65) Prior Publication Data
US 2023/0216839 A1    Jul. 6, 2023

(51) Int. Cl.
| | | |
|---|---|---|
| *H04L 29/06* | (2006.01) | |
| *H04L 9/40* | (2022.01) | |
| *H04L 41/12* | (2022.01) | |
| *H04L 69/326* | (2022.01) | |

(52) U.S. Cl.
CPC .......... *H04L 63/0807* (2013.01); *H04L 41/12* (2013.01); *H04L 69/326* (2013.01)

(58) Field of Classification Search
CPC ... H04L 63/0807; H04L 41/12; H04L 69/326; H04L 41/0893; Y02D 30/00
See application file for complete search history.

(56) References Cited

U.S. PATENT DOCUMENTS

| | | | | |
|---|---|---|---|---|
| 4,590,468 | A * | 5/1986 | Stieglitz | H04L 12/417 370/450 |
| 2005/0175183 | A1* | 8/2005 | Ovadia | H04J 14/0227 380/278 |
| 2017/0054645 | A1* | 2/2017 | Nishimura | H04L 47/283 |
| 2018/0048665 | A1* | 2/2018 | Shulman | H04L 63/1425 |
| 2018/0145955 | A1* | 5/2018 | Nirwal | H04L 63/068 |
| 2020/0007531 | A1* | 1/2020 | Koottayi | H04L 67/146 |
| 2020/0404076 | A1* | 12/2020 | Mahadevan | H04L 67/34 |
| 2021/0105268 | A1* | 4/2021 | Huber | H04W 12/64 |
| 2022/0141027 | A1* | 5/2022 | Gaal | H04L 63/062 713/168 |
| 2022/0393784 | A1* | 12/2022 | Li | H04J 3/0655 |

* cited by examiner

*Primary Examiner* — Ka Shan Choy
(74) *Attorney, Agent, or Firm* — Amin, Turocy & Watson, LLP

(57) ABSTRACT

Technology described herein can globally perform management of security tokens of plural nodes of a multi-node system. In an embodiment, a system can comprise an interconnected group of server nodes, and an administrator node communicatively connected to the interconnected group of server nodes and comprising a processor, and a memory that stores executable instructions that, when executed by the processor, facilitate performance of operations. The operations can comprise selecting a server node of the interconnected group of server nodes as a leader server node, resulting in a selection of the leader server node, in response, receiving, by the administrator node from the leader server node, a request for a new security token, and sending, to the leader server node, the new security token, and broadcasting, by the leader server node across a link layer discovery (LLDP) network, the new security token to additional nodes of the interconnected group of nodes.

20 Claims, 10 Drawing Sheets

SERVER NODE-CONTROLLED ADVERTISEMENT

BACKGROUND

Server node systems can comprise a plurality of servers, routers and controllers. Control of communications among the servers, broadcasting to the servers, maintenance of security protocols and bandwidth balancing, among other operations, can be managed by one or more administrator devices, such as one or more computers, servers and/or the like. Maintenance of security protocols can include validating, generating and/or analyzing tokens, such as security tokens, bearer tokens and/or the like. These operations can be executed for each node (e.g., each server) of a server system, and in one or more cases, can be executed frequently.

SUMMARY

The following presents a simplified summary of the disclosed subject matter to provide a basic understanding of one or more of the various embodiments described herein. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example method can comprise determining, by a system comprising a processor, a link layer discovery protocol (LLDP) network communicatively interconnecting a group of nodes individually comprising a per-node remote access controller, obtaining, by the system, a notification for a new security token from a first node of the group of nodes, and in response to obtaining the notification, broadcasting, by the system, via the LLDP network, the new security token to a second node of the group of nodes using the per-node remote access controller of the second node.

An example server system can comprise an interconnected group of server nodes; and an administrator node communicatively connected to the interconnected group of server nodes and comprising a processor, and a memory that stores executable instructions that, when executed by the processor, facilitate performance of operations. The operations can comprise selecting a server node of the interconnected group of server nodes as a leader server node, resulting in a selection of the leader server node, in response, receiving, by the administrator node from the leader server node, a request for a new security token, and sending, to the leader server node, the new security token, and broadcasting, by the leader server node across a link layer discovery (LLDP) network, the new security token to additional server nodes of the interconnected group of server nodes.

An example of a non-transitory computer-readable medium can comprise executable instructions that, when executed by a processor, can facilitate performance of operations. The operations can comprise obtaining a request notification for a new security token from one node of a group of nodes, and in response to obtaining the request notification, broadcasting, across a link layer discovery protocol (LLDP) network, the new security token to additional nodes of the group of nodes using a top of rack (TOR) switch connected to the LLDP network.

BRIEF DESCRIPTION OF THE DRAWINGS

The technology described herein is illustrated by way of example and not limited in the accompanying figures in which like reference numerals indicate similar elements.

DETAILED DESCRIPTION

Overview

Figure 1:
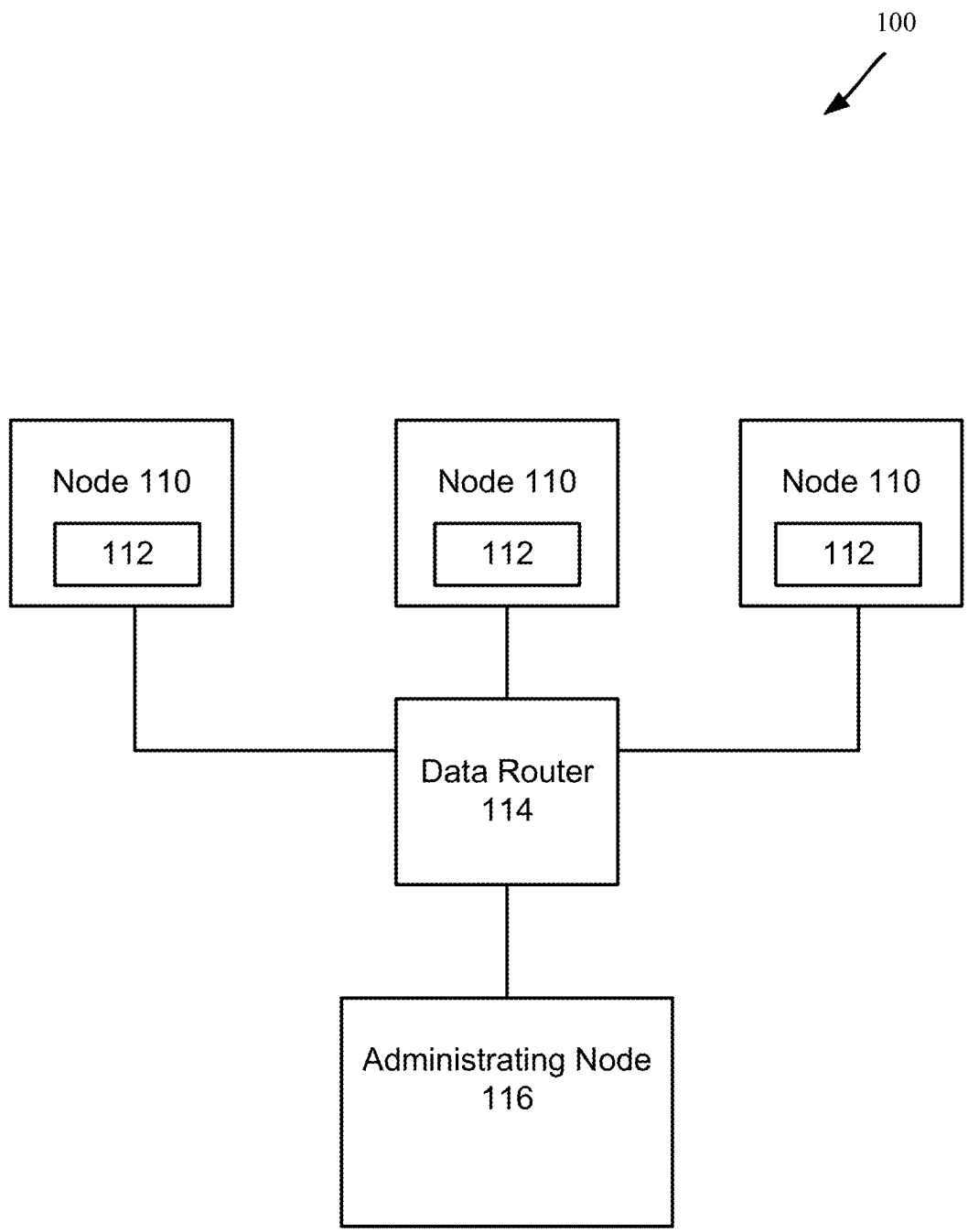
FIG. 1 illustrates a schematic representation of example elements of a server system, such as a local cloud storage server system, in accordance with one or more embodiments and/or implementations described herein.

The technology described herein is generally directed towards an efficient process to requesting, generating and distributing security tokens to plural nodes, such as server nodes, of a multi-node system. The multi-node system can, in one or more embodiments, facilitate local cloud storage. In one or more other embodiments, the multi-node system can additionally and/or alternatively facilitate virtual desktops, remote connections, local storage, provision of one or more services, and/or the like. The nodes of the multi-node system can communicate with one another and each can be controlled, maintained and/or otherwise monitored by an administrator node, such as an administrator server.

In the processes of use of, communication between, storage at, and/or retrieval from the one or more nodes of such multi-node storage system, various security tokens can be employed to facilitate maintenance of security of the multi-node storage system. In one case, an application programming interface (API) key can be employed and re-generated at a first frequency and/or whenever an API key is determined to possibly be compromised or malfunctioning. The API key can be employed to establish a secure session with an administrating node and/or with a respective IT entity. In another case, additionally and/or alternatively, a bearer token can be employed to maintain short term access, and can be regenerated at a second frequency being smaller than the first frequency.

However, these security tokens (e.g., API keys and bearer tokens) can be requested often, replaced often and/or requested/replaced by a plurality of nodes at a same time. Security changes via IT services and/or via an administrating node can be frequent depending on guidelines, regulations, rules, software/hardware requirements and/or the like. Repetitive tasks can be performed across multiple nodes. Further, even where a security token is not requested often, such as in the case of a yearly replaced API key, refreshing an API key for a plurality of nodes at a same time can cause significant drain on the multi-node system, on IT services and/or on the administrating node. Likewise, where an update, service or other operation is a per-node operation, the operation is repeated on all nodes, thus again creating the throttling of one or more administrating nodes and/or servers of the administrating node(s). Bandwidth can be reduced, latency can be increased, processing power can be employed and/or time to distribute an API key to each of the nodes of the plurality of nodes of a multi-node system can be undesirably long.

Furthermore, a per-server or per-node program employing a security token can emit disk events on LCL as rendered by a software-defined storage (SDS) layer on a respective operating system (OS) of one or more nodes (e.g., each including one or more servers). The SDS can, in one or more cases, create a pool with disks from other nodes, thus undesirably resulting in events on disk(s), which events do not belong to the node having the disk(s).

One or more embodiments of devices, systems, methods and/or non-transitory machine-readable mediums are described herein that can account for one or more of these deficiencies to provide a more efficient, faster and/or less resource-intensive process to managing security tokens. As used herein, managing can comprise receiving requests, generating and/or distributing such security tokens. The management can be facilitated at least in part due to delegation of one or more operations for the management to one or more nodes of a multi-node system, e.g., transferring such one or more operations from a respective administrating node. In one or more examples, a leader node can be identified. In one or more examples, communication broadcasting can be employed in place of per-node communications.

Briefly, a security token management system described herein can leverage a management network over connected ports, a top of rack component, and/or a link layer discovery protocol (LLDP) network among the nodes to facilitate the aforementioned security token management, such as related to API keys and/or bearer tokens.

Reference throughout this specification to "one embodiment," "an embodiment," "one implementation," "an implementation," etc. means that a particular feature, structure, or characteristic described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

As used herein, with respect to any aforementioned and below mentioned uses, the term "in response to" can refer to any one or more states including, but not limited to: at the same time as, at least partially in parallel with, at least partially subsequent to and/or fully subsequent to, where suitable.

As used herein, the term "entity" can refer to a machine, device, smart device, component, hardware, software and/or human.

As used herein, the term "cost" can refer to power, money, memory, processing power and/or the like.

As used herein, the term "resource" can refer to power, money, memory, processing power and/or the like.

Example Architectures and Security Token Management Operations

One or more embodiments are now described with reference to the drawings, where like referenced numerals are used to refer to like elements throughout. In the following description, for purposes of explanation, numerous specific details are set forth to provide a more thorough understanding of the one or more embodiments. It is evident, however, in various cases, that the one or more embodiments can be practiced without these specific details.

Further, the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting system architecture 100 as illustrated at FIG. 1, and/or systems thereof, can further comprise one or more computer and/or computing-based elements described herein with reference to an operating environment, such as the operating environment 900 illustrated at FIG. 9. In one or more described embodiments, computer and/or computing-based elements can be used in connection with implementing one or more of the systems, devices, components and/or computer-implemented operations shown and/or described in connection with FIG. 1 and/or with other figures described herein.

Turning first to FIG. 1, a multi-node system 100 is illustrated that can employ the security token management system 202 to be described in detail below, in accordance with one or more embodiment described herein. The system 100 comprises a plurality of nodes 110, each comprising one or more servers 112. The nodes 110 are in communication with one another via a communication device, such as a data router 114. An administrating node 116 can comprise one or more servers and likewise also is interconnected with the nodes 110 via the data router 114. Although illustrated separately, in one or more embodiments, the administrating node 114 also can comprise one or more servers 112 and/or can be a server node 110.

Figure 2:
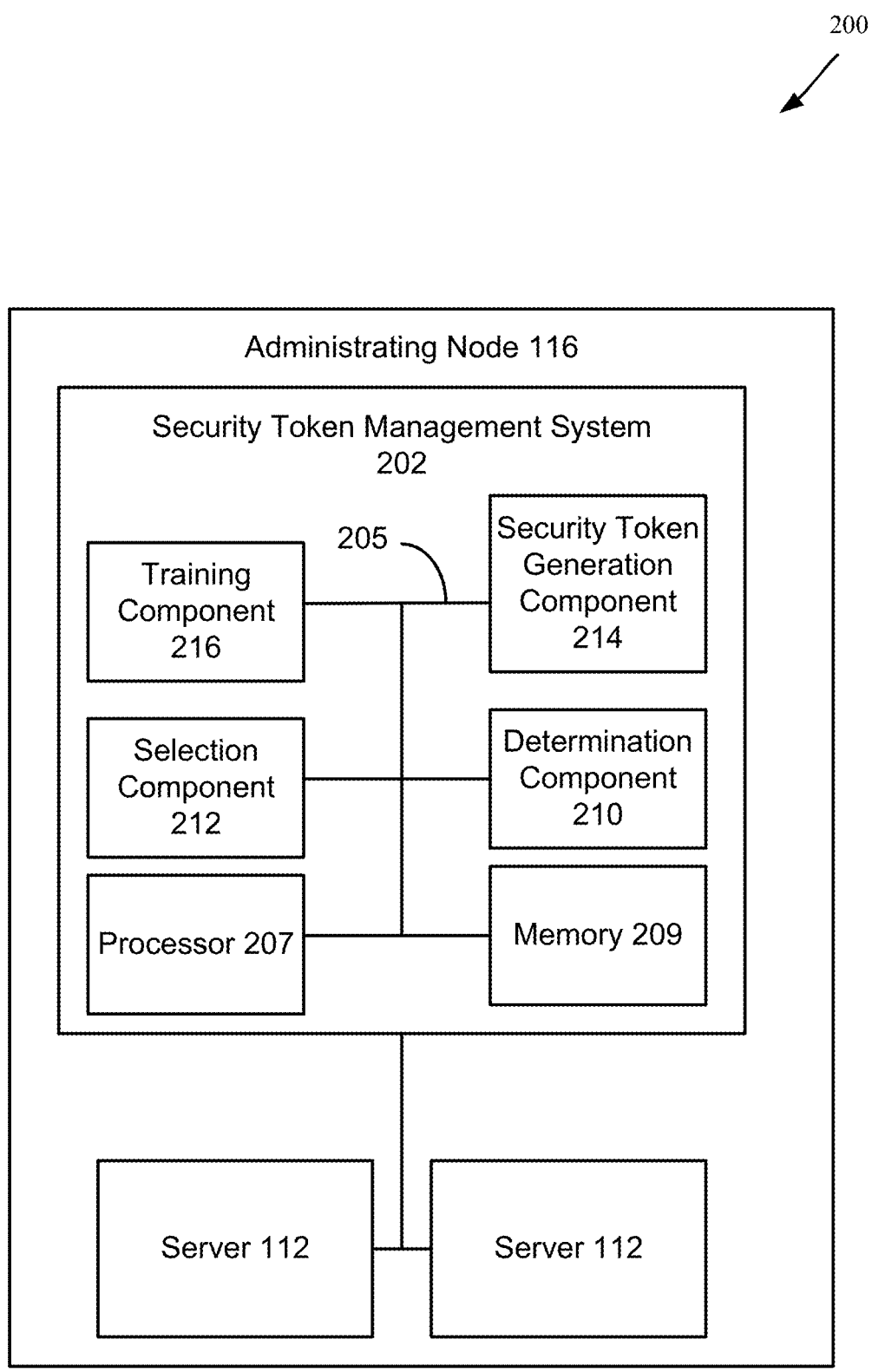
FIG. 2 illustrates a block diagram of a system for facilitating security token generation and distribution in a server system, in accordance with one or more embodiments and/or implementations described herein.

Turning next to FIG. 2, an example of an administrating node architecture is illustrated at 200, with description being provided below. While referring here to one or more processes, operations, facilitations and/or uses of the non-limiting system architecture 200, description provided herein, both above and below, also can be relevant to one or more other non-limiting system architectures described herein.

The non-limiting system architecture 200 can facilitate a process to manage one or more security tokens (e.g., API keys, bearer tokens and/or the like) requested by one or more group nodes 110. FIG. 2 illustrates the system architecture 200 comprising the administrating node 116, which comprises a security token management system 202. Generally, the security token management system 202 can leverage a management network over per-server controller dedicated ports of a per-server controller, and can employ a top of rack management router to thereby create networking among per-server-node management softwares (that is, respective software) installed on the various nodes 110 of a multi-node system 100. The network can be a layer2 network, such as a link layer discovery protocol (LLDP) network among the interconnected controllers served by the common top of rack management router (TOR).

Figure 3:
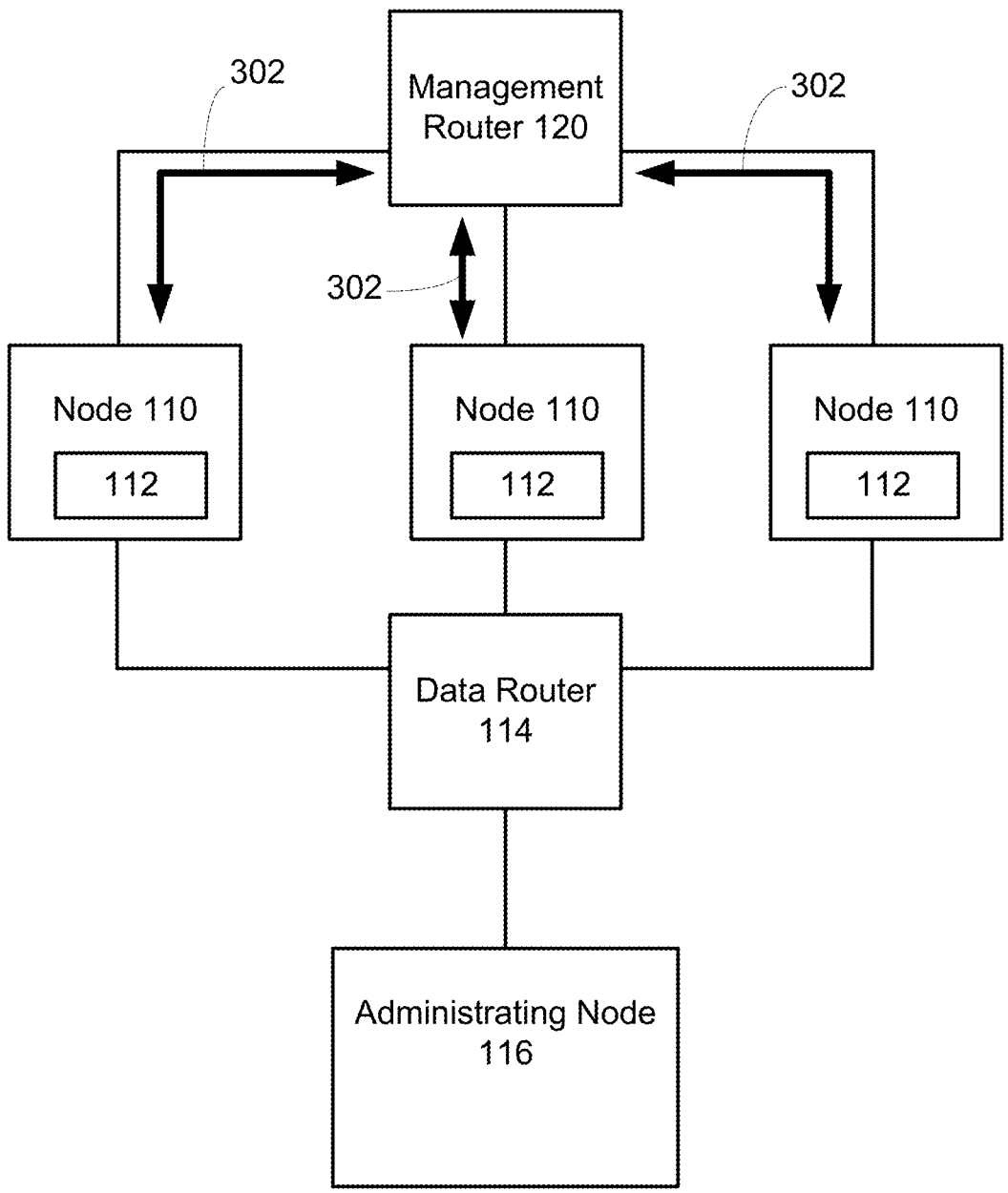
FIG. 3 illustrates a schematic diagram of use of the system of FIG. 2, in accordance with one or more embodiments and/or implementations described herein.

That is, FIG. 2 illustrates a detailed schematic of the administrating node 116 of FIG. 1. FIG. 3, to be discussed in detail below, illustrates the management network created for the multi-node system. FIGS. 4 to 8, also to be discussed in detail below, illustrate one or more additional operations performed at the multi-node system.

For example, turning briefly to FIG. 3, the LLDP network 302 is illustrated at the schematic diagram 300, which now includes the TOR 120 providing broadcasting advertisement to the various servers 112 of the various nodes 110. In one or more embodiments, the TOR 120 can be at least partially controlled by the administrating node 116, such as by the security token management system 202 thereof.

Turning again to FIG. 2, the various components of the security token management system 202 will now be described. Generally, the security token management system 202 can comprise any suitable computing devices, hardware, software, operating systems, drivers, network interfaces and/or so forth. However, for purposes of brevity, only components generally relevant to security token management are illustrated in FIG. 2. For example, the security token management system 202 can comprise a processor 207, memory 209, determination component 210, selection component 212, security token generation component 214 and/or training component 216.

Discussion first turns to the processor 107, memory 109 and bus 105 of the security token management system 202.

In one or more embodiments, security token management system 202 can comprise a processor 207 (e.g., computer processing unit, microprocessor, classical processor and/or like processor). In one or more embodiments, a component associated with security token management system 202, as described herein with or without reference to the one or more figures of the one or more embodiments, can comprise one or more computer and/or machine readable, writable and/or executable components and/or instructions that can be executed by processor 207 to facilitate performance of one or more processes defined by such component(s) and/or instruction(s). In one or more embodiments, the processor 207 can comprise one or more of the determination component 210, selection component 212, security token generation component 214 and/or training component 216.

In one or more embodiments, the security token management system 202 can comprise a machine-readable memory 209 that can be operably connected to the processor 207. The memory 209 can store computer-executable instructions that, upon execution by the processor 207, can cause the processor 207 and/or one or more other components of the security token management system 202 (e.g., determination component 210, selection component 212, security token generation component 214 and/or training component 216) to perform one or more actions. In one or more embodiments, the memory 209 can store computer-executable components (e.g., determination component 210, selection component 212, security token generation component 214 and/or training component 216).

Security token management system 202 and/or a component thereof as described herein, can be communicatively, electrically, operatively, optically and/or otherwise coupled to one another via a bus 205 to perform functions of non-limiting system architecture 200, security token management system 202 and/or one or more components thereof and/or coupled therewith. Bus 205 can comprise one or more of a memory bus, memory controller, peripheral bus, external bus, local bus and/or another type of bus that can employ one or more bus architectures. One or more of these examples of bus 205 can be employed to implement one or more embodiments described herein.

In one or more embodiments, security token management system 202 can be coupled (e.g., communicatively, electrically, operatively, optically and/or like function) to one or more external systems (e.g., a system management application), sources and/or devices (e.g., classical communication devices and/or like devices), such as via a network. In one or more embodiments, one or more of the components of the non-limiting system architecture 200 can reside in the cloud, and/or can reside locally in a local computing environment (e.g., at a specified location(s)).

In addition to the processor 207 and/or memory 209 described above, security token management system 202 can comprise one or more computer and/or machine readable, writable and/or executable components and/or instructions that, when executed by processor 207, can facilitate performance of one or more operations defined by such component(s) and/or instruction(s).

The determination component 210 can generally determine a link layer discovery protocol (LLDP) network communicatively interconnecting the group of nodes 110 of the multi-node system 100. The LLDP network (e.g., layer2 network) can be generated by the administrating node 116 and/or any other node, such as employing one or more controllers having controller ports at each of the nodes 110. Further, employing a management router 120 (e.g., TOR) and the controller ports, broadcasts can be provided to the various nodes 110 over a secure LLDP network, such as absent individual credentials for each node being employed.

In one or more embodiments, the security token management system 202, such as the determination component 210 can facilitate request and/or obtaining from one or more nodes, one or more attributes of the per-node remote access controller of the respective nodes. An LLDP data unit can be employed as a payload for each node for which the one or more attributes are being obtained. In this way, via the controllers, the LLDP network can be generated.

The selection component 212 can obtain one or more communications, such as a communication from each node 110, including a notification for a new security token. The selection component further can select, such as randomly, one node of the group of nodes as a leader node. In one or more embodiments, the selection can be facilitated by a random number generator and/or a randomization procedure/technique. In response to selecting the leader node, the selection component 212, such as via the TOR 120 can facilitate broadcasting of the selection to each of the nodes 110.

Also, in response to selecting the leader node, a new security token can be generated, such as by the security token generation component 214. This generation can be facilitated by any suitable method. In one or more embodiments, each node can suggest a proposed new security token, and the proposed new security token of the selected leader node can be employed by the security token generation component 214 as the new security token and/or to generate a new security token.

In response to generation of a new security token, the security token generation component 214 in combination with the TOR 120 can facilitate broadcasting of the new security token to each of the nodes other than the leader node. Although, the broadcast also can be to the leader node. In one or more embodiments, this general broadcasting can comprise first sending the new security token via the LLDP network to the leader node. The leader node can send a request to the administrating node 116 to broadcast the new security token. And thus, the TOR 120 can be employed to facilitate the broadcasting.

In one or more embodiments, a same leader node can be employed for request, generation and distribution of one or more additional security tokens. For example, where other nodes may send one or more security token requests, the administrating node 116 can respond only to the leader node. In one or more cases, a new security token can be requested by the leader node at a selectively determined frequency. The selectively determined frequency can be determined by the administrating node 116 and/or by an administrating entity controlling the administrating node 116. In one or more embodiments, a new security token can be employed where the leader node receives a communication that the present security token is malfunctioning, errored, corrupted and/or compromised. In one or more embodiments, whether the administrating node 116 receives such communication, the administrating node 116 can request that the lead node request a new security token.

In one or more embodiments, a new leader node can be selected at a selectively determined frequency. For example, the leader classification of the leader node can be removed every instance of security token generation, and/or at any other selectively determined frequency that is determined by the administrating node 116 and/or administrating entity controlling the administrating node 116.

Additionally, the security token management system 202 can comprise the training component 216, which generally can facilitate provision of one or more instructions, operations and/or directions to one or more nodes 110 of the multi-node system 100 to put in place the aforementioned method of security token generation.

Figure 4:
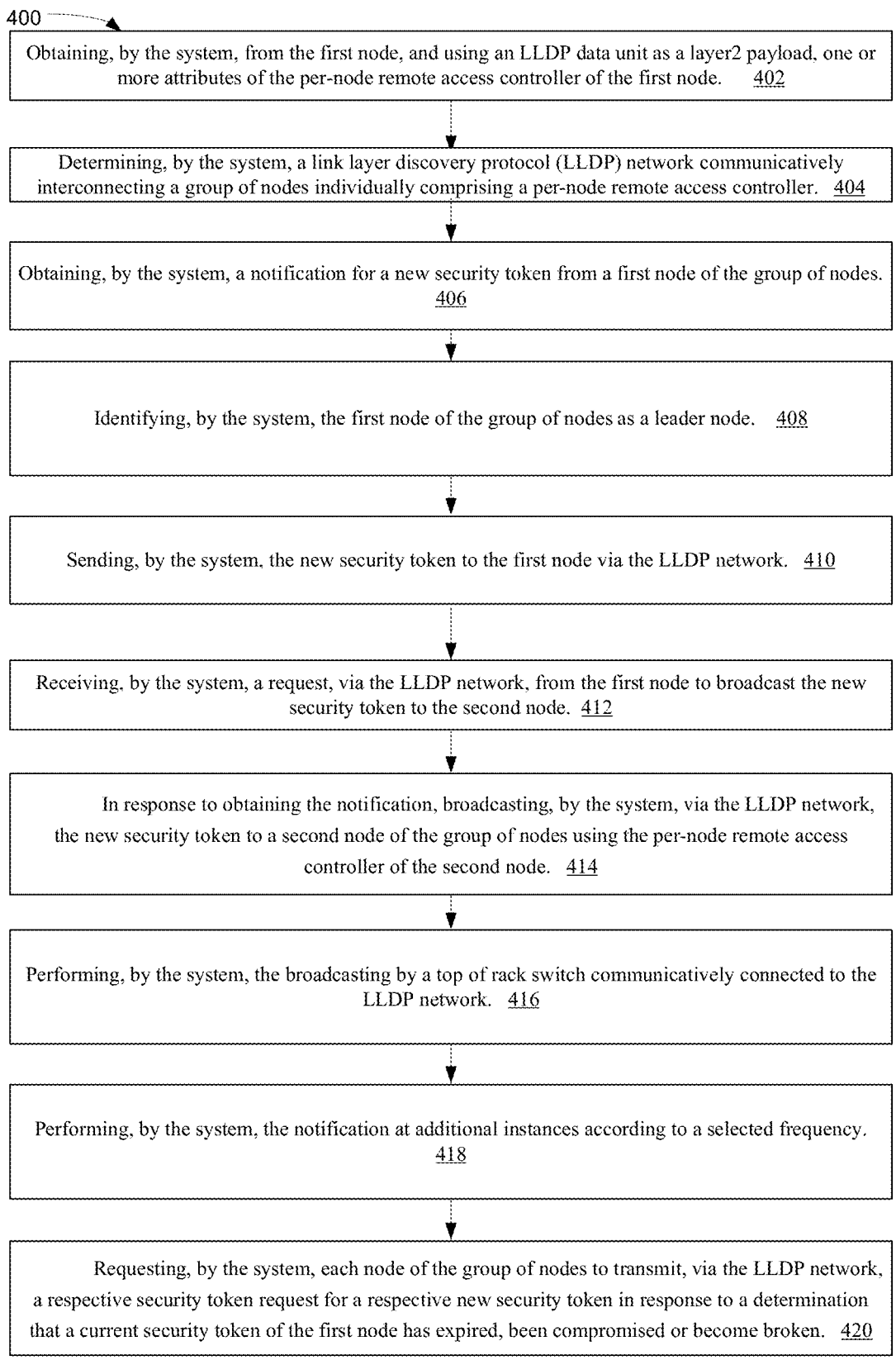
FIG. 4 illustrates a process flow diagram of a general method of security token request, generation and distribution, in accordance with one or more embodiments and/or implementations described herein.

Turning next to FIG. 4, a process flow comprising a set of operations is illustrated relative to FIG. 2. One or more elements, objects and/or components referenced in the process flow 400 can be those of architecture 100 and/or diagram 200. Repetitive description of like elements and/or processes employed in respective embodiments is omitted for sake of brevity.

At operation 402, the process flow 400 can comprise obtaining, by the system (e.g., determination component 210), from the first node, and using an LLDP data unit as a layer2 payload, one or more attributes of the per-node remote access controller of the first node.

At operation 404, the process flow 400 can comprise determining, by the system (e.g., determination component 210), a link layer discovery protocol (LLDP) network communicatively interconnecting a group of nodes individually comprising a per-node remote access controller.

At operation 406, the process flow 400 can comprise obtaining, by the system (e.g., selection component 212), a notification for a new security token from a first node of the group of nodes. Indeed, in one or more embodiments, a notification for a new security token can be obtained from a plurality of nodes of the group of nodes.

At operation 408, the process flow 400 can comprise identifying, by the system, the first node of the group of nodes as a leader node.

At operation 410, the process flow 400 can comprise sending, by the system (e.g., security token generation component 214), the new security token to the first node via the LLDP network.

At operation 412, the process flow 400 can comprise receiving, by the system (e.g., determination component 210), a request, via the LLDP network, from the first node to broadcast the new security token to the second node.

At operation 414, the process flow 400 can comprise in response to obtaining the notification, broadcasting, by the system, via the LLDP network, the new security token to a second node of the group of nodes using the per-node remote access controller of the second node.

At operation 416, the process flow 400 can comprise performing, by the system (e.g., TOR 120), the broadcasting by a top of rack switch communicatively connected to the LLDP network.

At operation 418, the process flow 400 can comprise performing, by the system (e.g., the leader node of the multi-node system), the notification at additional instances according to a selected frequency.

At operation 420, the process flow 400 can comprise requesting, by the system (e.g., security token management system 202), each node of the group of nodes to transmit, via the LLDP network, a respective security token request for a respective new security token in response to a determination that a current security token of the first node has expired, been compromised or become broken.

Figure 5:
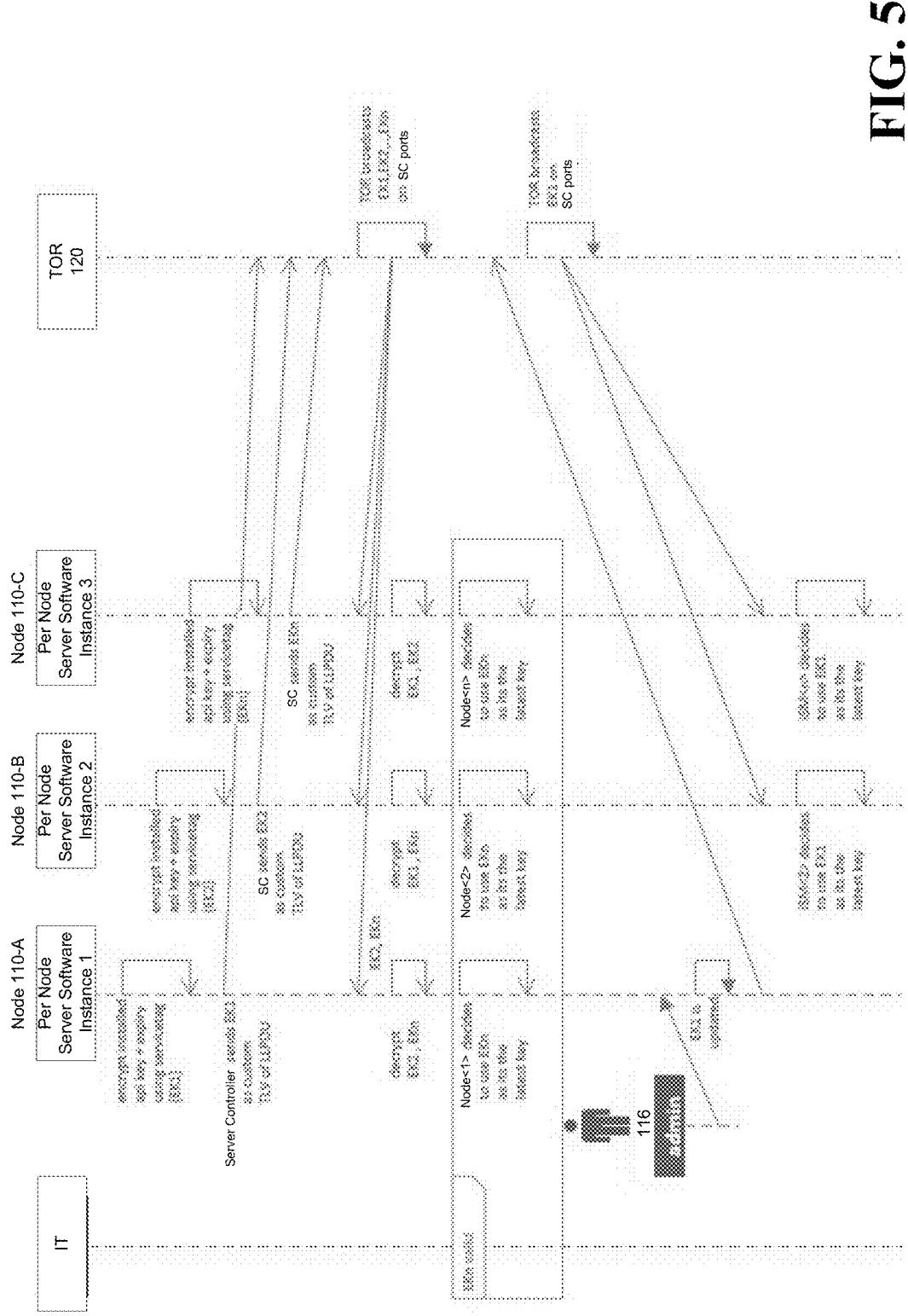
FIG. 5 illustrates a process flow diagram of a method of distribution of API keys, in accordance with one or more embodiments and/or implementations described herein.
Figure 6:
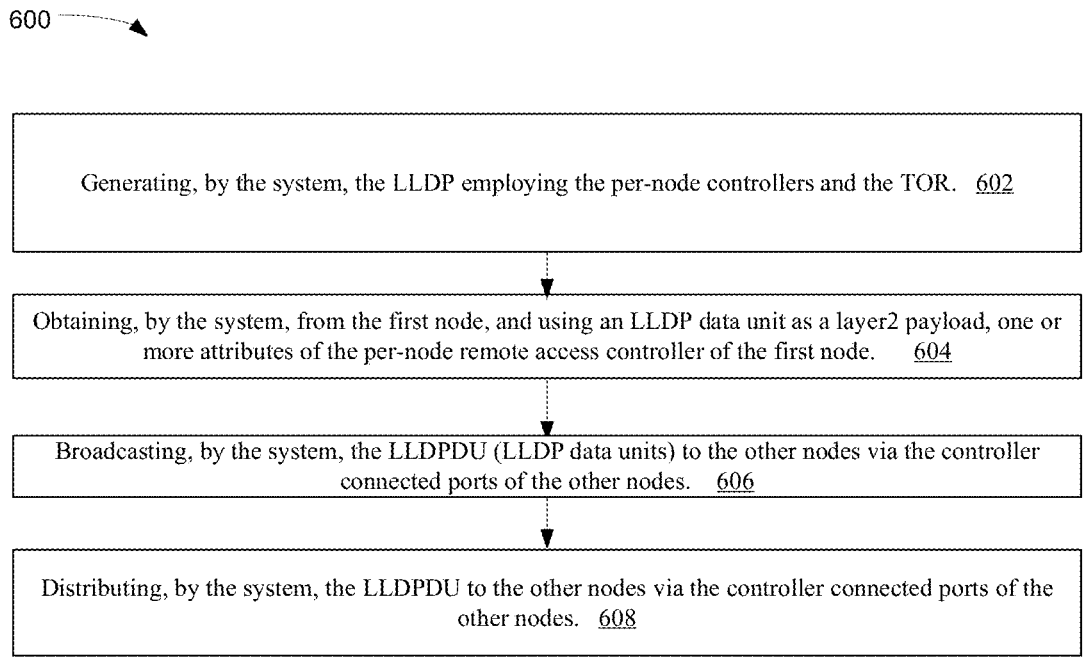
FIG. 6 illustrates another process flow diagram of a method of distribution of API keys, in accordance with one or more embodiments and/or implementations described herein.

Turning now to FIGS. 5 and 6, a first advertisement scenario is described, still relative to use of the architecture 200 and security token management system 202. The first advertisement scenario is more particularly directed to distribution of API keys, rather than the more general distribution of general security tokens of FIG. 4.

Referring first to FIG. 5, IT API keys can be secret assets carried by an administrating entity and/or administrating node (e.g., administrating node 216). Depending on respective IT policy, compromised and/or expired API keys can be requested to be replaced and/or renewed. As illustrated at FIG. 5, the sequence demonstrates how the API keys can be distributed among 1 to n management softwares of 1 to n client nodes connected to one another via the TOR 120. Briefly, generally, the LLDPDU can be employed as a layer2 payload to transact required management software attributes on a per-node basis. The TOR 120 then can broadcast an LLDPU to other node management softwares via the controller connected ports of these nodes 110.

Turning now to FIG. 6, a process flow comprising a set of operations is illustrated relative to FIG. 5. One or more elements, objects and/or components referenced in the process flow 600 can be those of architecture 100 and/or diagram 200. Repetitive description of like elements and/or processes employed in respective embodiments is omitted for sake of brevity.

At operation 602, the process flow 600 can comprise generating, by the system (e.g., security token management system 202 and/or administrating node 116), the LLDP employing the per-node controllers and the TOR (e.g., TOR 120).

At operation 604, the process flow 600 can comprise obtaining, by the system (e.g., selection component 212), from the first node, and using an LLDP data unit as a layer2 payload, one or more attributes of the per-node remote access controller of the first node.

At operation 606, the process flow 600 can comprise broadcasting, by the system (e.g., TOR 120), the LLDPDU (LLDP data units) to the other nodes via the controller connected ports of the other nodes.

At operation 608, the process flow 600 can comprise distributing, by the system (e.g., security token generation component 214), the new API key, such as via the TOR (e.g., TOR 120).

Figure 7:
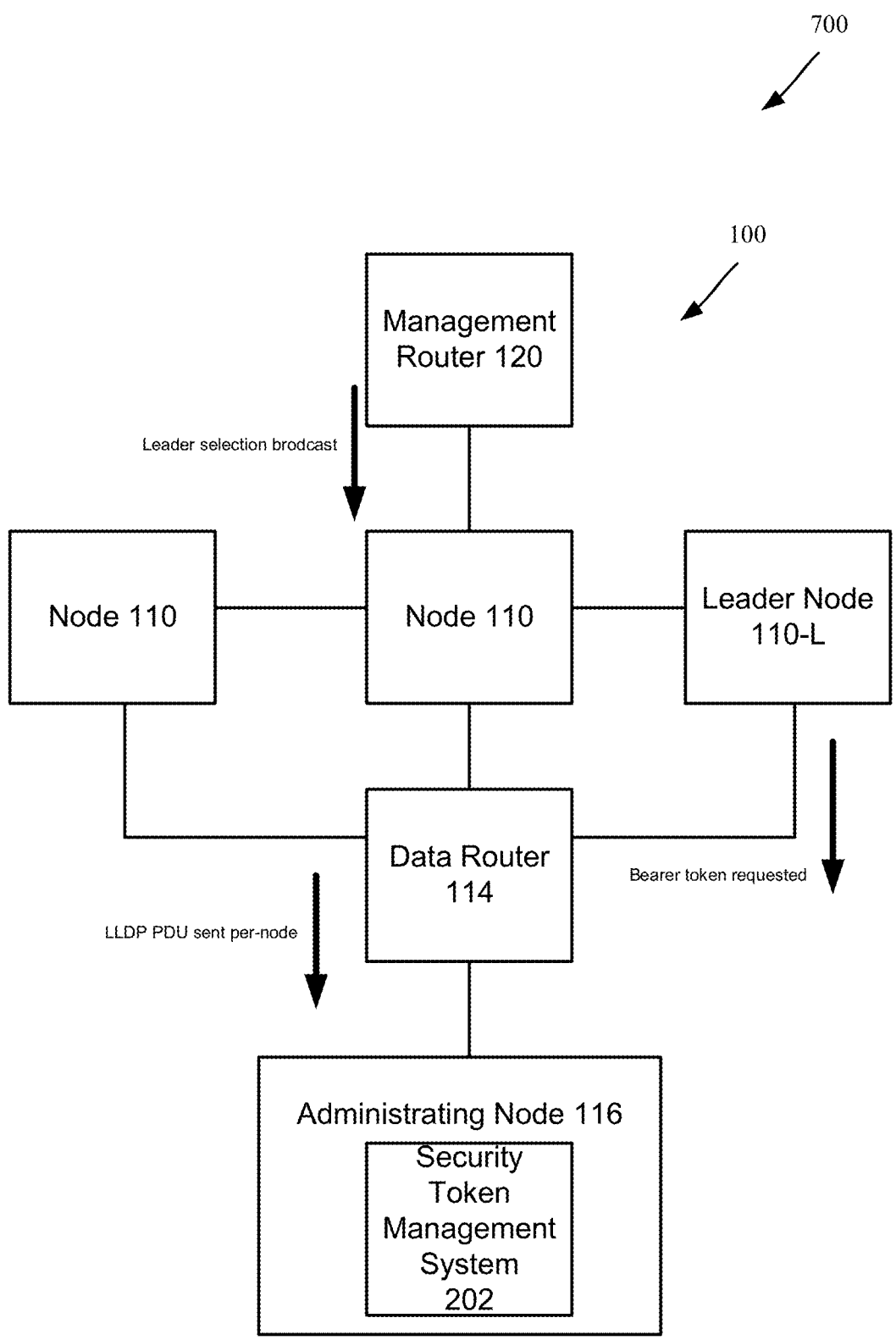
FIG. 7 illustrates a block diagram of another system for facilitating security token generation and distribution in a server system, in accordance with one or more embodiments and/or implementations described herein.
Figure 8:
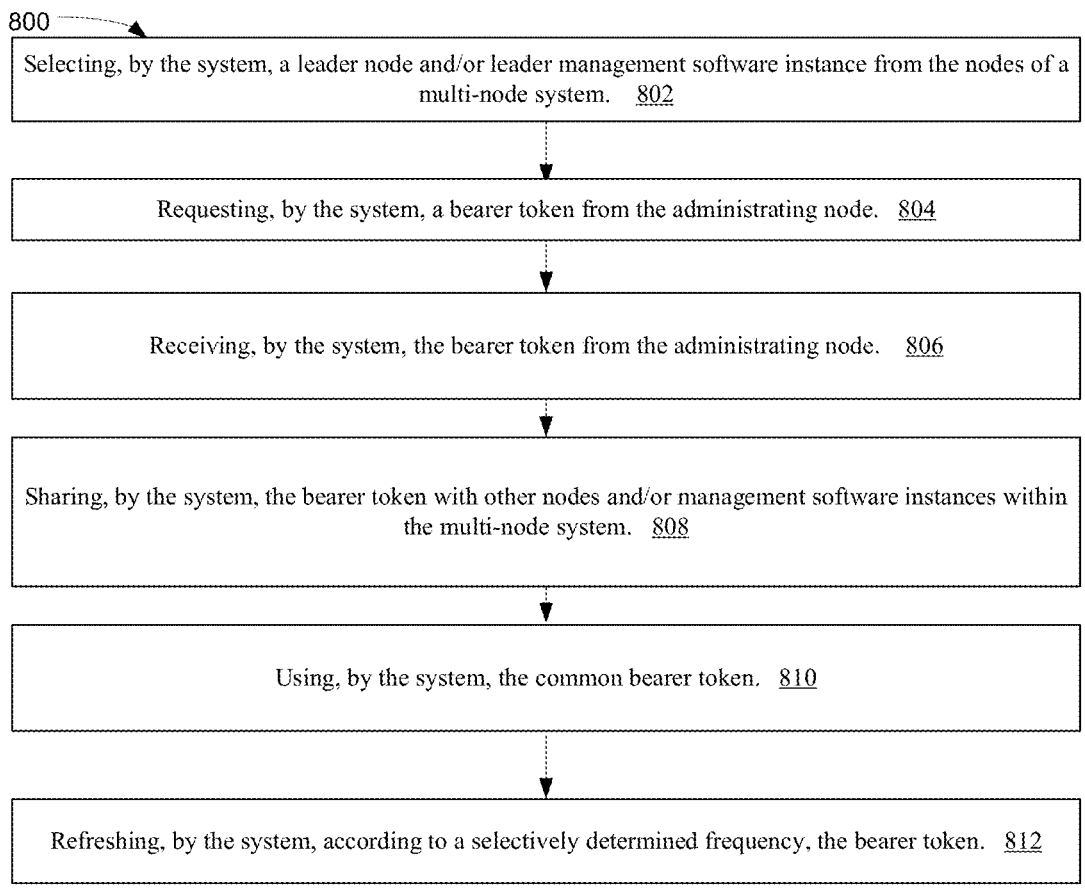
FIG. 8 illustrates a process flow diagram of a method of distribution of bearer tokens, in accordance with one or more embodiments and/or implementations described herein.

Turning now to FIGS. 7 and 8, a second advertisement scenario is described, still relative to use of the architecture 200 and security token management system 202. The second advertisement scenario is more particularly directed to distribution of bearer tokens, rather than the more general distribution of general security tokens of FIG. 4.

Referring first to FIG. 7, security bearer tokens can function in addition to API keys. Bearer tokens can be generated, such as by IT or the administrating node 116, such as based on a client node request. The bearer tokens can be employed as a short term authentication key, such as for generation of an IT service session and/or to honor further IT requests from the client node. In some cases, bearer tokens can be required to be frequently requested and/or generated, such as every hour. Where a multi-node system comprises plural nodes, this continuous requesting can significantly throttle one or more administrating nodes 116.

Rather, employing the one or more embodiments described herein, a single instance of a bearer token can be generated, such as from a single instance of a per-node management software, and then broadcast to other nodes. This can reduce and/or eliminate the aforementioned throttling risk.

As illustrated at FIG. 7, the following processes can be employed, such as by the processor 207, to first select a leader node, and second, in response to the leader node selection, generate bearer tokens by the system (e.g., security token management system 202).

A first procedure for selecting a leader node over an LLDP procedure is provided below. The LLDP Procedure #1 can be stored at and/or otherwise accessed by the selection component 212, for example.

Procedure #1:
i. Management software of Node-1 sends LLDP PDU with "I am present" with random salt×1.
ii. Management software of Node2 sends LLDP PDU with "I am present" with random salt×2.
iii. Management software of Node-3 sends LLDP PDU with "I am present" with random salt×3.
iv. Every node waits for some time to see if it receives "I am leader" packet.
v. Management software of Node-1 receives ×2 and ×3.
vi. Compute if ×1 is greater, if so multicasts "I am selected leader".
vi. Management softwares of Nodes-2 and -3 does step 4 as well.
vii. Now leader is selected. E.g., Node 2 (leader node 110-L) is selected leader.
viii. Node 2 (e.g., management software thereof) creates Dell IT session.
ix. Node 2 (e.g., management software thereof) encrypts IT session with ×2.
x. Node 2 (e.g., management software thereof) sends a LLDP PDU with encrypted IT session.
xi. Nodes 1 and 3 (e.g., management softwares thereof) receive encrypted IT session.
xii. Nodes 1 and 3 (e.g., management softwares thereof) decrypt with ×2.

The second procedure for generating the one or more bearer tokens is provided below. The bearer token generation Procedure #2 can be stored at and/or otherwise accessed by the security token generation component 214, for example.

Procedure #2:
1. Select a leader management software instance within the multi-node system (e.g., multi-node system 100).
2. Leader management software instances requests for bearer token from IT.
3. Leader management software instance shares the bearer token with other management software instances within the multi-node system.
4. All management software instances within the multi-node system use the same bearer token.
5. According to a selectively determined frequency (e.g., an hour), the bearer token is refreshed by leader management software.
6. Go back to step 2.

Turning now to FIG. 8, a process flow comprising a set of operations is illustrated relative to FIG. 7. One or more elements, objects and/or components referenced in the process flow 800 can be those of architecture 100 and/or diagram 200. Repetitive description of like elements and/or processes employed in respective embodiments is omitted for sake of brevity.

At operation 802, the process flow 800 can comprise selecting, by the system (e.g., selecting component 212), a leader node and/or leader management software instance from the nodes of a multi-node system.

At operation 804, the process flow 800 can comprise requesting, by the system (e.g., node 110), a bearer token from the administrating node.

At operation 806, the process flow 800 can comprise receiving, by the system (e.g., by node 110), the bearer token from the administrating node.

At operation 808, the process flow 800 can comprise sharing, by the system (e.g., by node 110 and TOR 120), the bearer token with other nodes and/or management software instances within the multi-node system.

At operation 810, the process flow 800 can comprise using, by the system (e.g., nodes 110), the common bearer token.

At operation 812, the process flow 800 can comprise refreshing, by the system (e.g., by node 110), according to a selectively determined frequency, the bearer token.

For simplicity of explanation, the computer-implemented methodologies and/or processes provided herein are depicted and/or described as a series of acts. The subject innovation is not limited by the acts illustrated and/or by the order of acts, for example acts can occur in one or more orders and/or concurrently, and with other acts not presented and described herein. The operations of process flows of diagrams 400, 600 and/or 800 are example operations, and there can be one or more embodiments that implement more or fewer operations than are depicted.

Furthermore, not all illustrated acts can be utilized to implement the computer-implemented methodologies in accordance with the described subject matter. In addition, the computer-implemented methodologies could alternatively be represented as a series of interrelated states via a state diagram or events. Additionally, the computer-implemented methodologies described hereinafter and throughout this specification are capable of being stored on an article of manufacture to facilitate transporting and transferring the computer-implemented methodologies to computers. The term article of manufacture, as used herein, is intended to encompass a computer program accessible from any machine-readable device or storage media.

In summary, technology described herein can globally perform management of security tokens of plural nodes of a multi-node system. In an embodiment, a system can comprise an interconnected group of server nodes, and an administrator node communicatively connected to the interconnected group of server nodes and comprising a processor, and a memory that stores executable instructions that, when executed by the processor, facilitate performance of operations. The operations can comprise selecting a server node of the interconnected group of server nodes as a leader server node, resulting in a selection of the leader server node, in response, receiving, by the administrator node from the leader server node, a request for a new security token, and sending, to the leader server node, the new security token, and broadcasting, by the leader server node across a link layer discovery (LLDP) network, the new security token to additional nodes of the interconnected group of nodes.

As a result, a method can be provided to propagate information (e.g., for distributing credentials) without credentials themselves using a layer2 network. A practical application of one or more techniques performed by one or more embodiments described herein can be reduction and/or elimination of a throttling and/or congestion issue for an administrating node of a multi-node system. Likewise, network bandwidth consumption and processing power can be reduced, such as absent responding to a request for a security token from each node at each instance.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

One or more embodiments described herein are inherently and/or inextricably tied to computer technology and cannot be implemented outside of a computing environment. For example, one or more processes performed by one or more embodiments described herein can more efficiently, and even more feasibly, provide program and/or program instruction execution as compared to existing systems and/or techniques. Systems, computer-implemented methods and/or computer program products facilitating performance of these processes are of great utility in the field of data storage and/or multi-server system management and cannot be equally practicably implemented in a sensible way outside of a computing environment.

One or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively manage digital security tokens in the time that one or more embodiments described herein can facilitate this process. And, neither can the human mind nor a human with pen and paper electronically manage digital security tokens as conducted by one or more embodiments described herein.

In one or more embodiments, one or more of the processes described herein can be performed by one or more specialized computers (e.g., a specialized processing unit, a specialized classical computer, and/or another type of specialized computer) to execute defined tasks related to the one or more technologies describe above. One or more embodiments described herein and/or components thereof can be employed to solve new problems that arise through advancements in technologies mentioned above, employment of cloud computing systems, computer architecture and/or another technology.

One or more embodiments described herein can be fully operational towards performing one or more other functions (e.g., fully powered on, fully executed and/or another function) while also performing the one or more operations described herein.

Example Operating Environment

Figure 9:
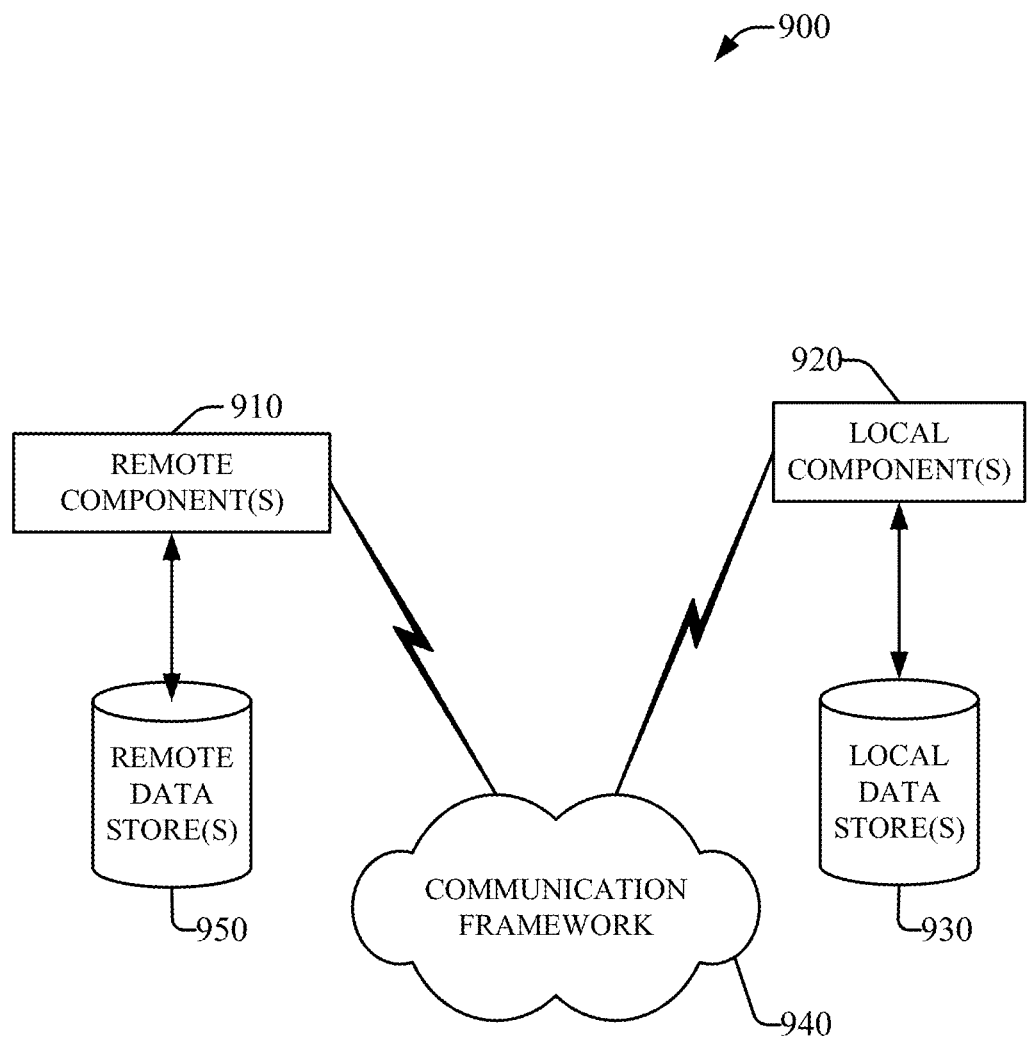
FIG. 9 illustrates a block diagram of an example operating environment into which embodiments of the subject matter described herein can be incorporated.

FIG. 9 is a schematic block diagram of an operating environment 900 with which the described subject matter can interact. The system 900 comprises one or more remote component(s) 910. The remote component(s) 910 can be hardware and/or software (e.g., threads, processes, computing devices). In some embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise an automatic scaling component and/or programs that communicate/use the remote resources 910 and 920, etc., connected to a remotely located distributed computing system via communication framework 940.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

Example Computing Environment

Figure 10:
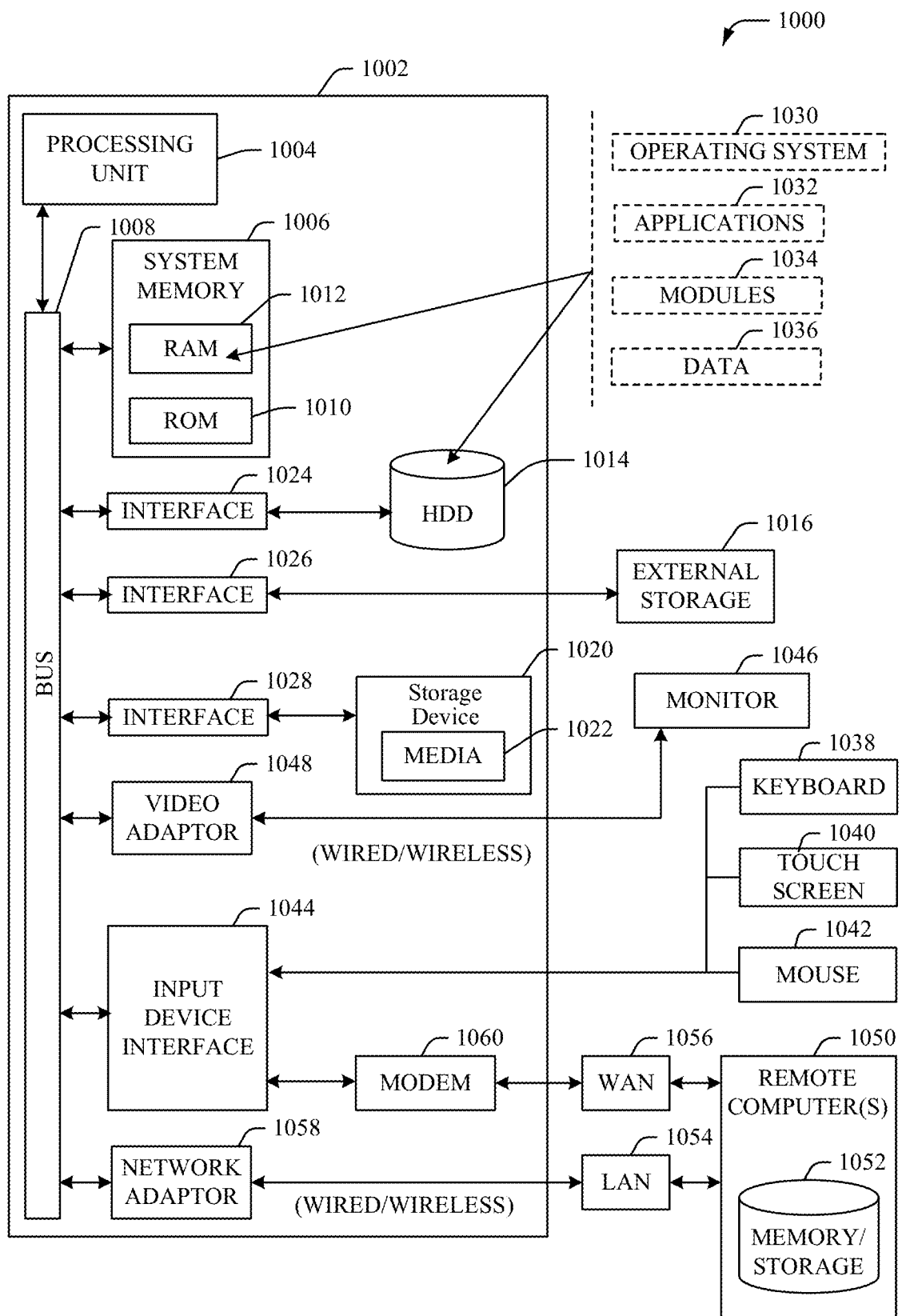
FIG. 10 illustrates an example schematic block diagram of a computing environment with which the subject matter described herein can interact and/or be implemented at least in part, in accordance with one or more embodiments and/or implementations described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Referring still to FIG. 10, the example computing environment 1000 which can implement one or more embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), and can include one or more external storage devices 1016 (e.g., a magnetic floppy disk drive (FDD) 1016, a memory stick or flash drive reader, a memory card reader, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014.

Other internal or external storage can include at least one other storage device 1020 with storage media 1022 (e.g., a solid state storage device, a nonvolatile memory device, and/or an optical disk drive that can read or write from removable media such as a CD-ROM disc, a DVD, a BD, etc.). The external storage 1016 can be facilitated by a network virtual machine. The HDD 1014, external storage device(s) 1016 and storage device (e.g., drive) 1020 can be connected to the system bus 1008 by an HDD interface 1024, an external storage interface 1026 and a drive interface 1028, respectively.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. The network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

The above description of illustrated embodiments of the one or more embodiments described herein, comprising what is described in the Abstract, is not intended to be exhaustive or to limit the described embodiments to the precise forms described. While one or more specific embodiments and examples are described herein for illustrative purposes, various modifications are possible that are considered within the scope of such embodiments and examples, as those skilled in the relevant art can recognize.

In this regard, while the described subject matter has been described in connection with various embodiments and corresponding figures, where applicable, other similar embodiments can be used or modifications and additions can be made to the described embodiments for performing the same, similar, alternative, or substitute function of the described subject matter without deviating therefrom. Therefore, the described subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures to optimize space usage or enhance performance of user equipment. A processor can also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. However, there is no intention to limit the various embodiments to the one or more specific forms described, but on the contrary, the intention is to cover all modifications, alternative constructions, and equivalents falling within the spirit and scope.

In addition to the various implementations described herein, other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A method, comprising:
   determining, by a system comprising a processor, a link layer discovery protocol (LLDP) network communicatively interconnecting a group of nodes comprising respective per-node remote access controllers;
   requesting, by the system, a plurality of nodes of the group of nodes to transmit, via the LLDP network, respective security token requests for respective new security tokens in response to a determination that a current security token has expired, been compromised or become broken;
   in response to the requesting, obtaining, by the system, a notification for a new security token from at least a first node of the group of nodes; and
   in response to obtaining the notification, broadcasting, by the system, via the LLDP network, the new security token to a second node of the group of nodes using the per-node remote access controller of the second node.

2. The method of claim 1, further comprising:
   obtaining, by the system, from the first node, and using an LLDP data unit as a layer2 payload, one or more attributes of the per-node remote access controller of the first node.

3. The method of claim 1, wherein the broadcasting is performed by a top of rack switch communicatively connected to the LLDP network.

4. The method of claim 1, further comprising:
   sending, by the system, the new security token to the first node via the LLDP network; and
   obtaining, by the system, a request, via the LLDP network, from the first node to broadcast the new security token to the second node.

5. The method of claim 1, further comprising:
   identifying, by the system, the first node of the group of nodes as a leader node for the group of nodes.

6. The method of claim 5, wherein the obtaining of the notification is repeatedly performed at additional instances according to a selected frequency.

7. The method of claim 6, wherein the new security token is a bearer token.

8. The method of claim 1, wherein the new security token comprises an application programming interface key or a bearer token.

9. A server system, comprising:
an interconnected group of server nodes; and
an administrator node communicatively connected to the interconnected group of server nodes and comprising a processor, and a memory that stores executable instructions that, when executed by the processor, facilitate performance of operations, comprising:
selecting a server node of the interconnected group of server nodes as a leader server node, resulting in a selection of the leader server node;
in response, receiving, by the administrator node from the leader server node, a request for a new security token, and sending, to the leader server node, the new security token; and
broadcasting, by the leader server node across a link layer discovery (LLDP) network, the new security token to additional server nodes of the interconnected group of server nodes,
wherein the obtaining of the notification is repeatedly performed at additional instances according to a selected frequency.

10. The server system of claim 9, wherein the server nodes of the interconnected group of server nodes comprise respective per-node remote access controllers, and wherein the server nodes of the interconnected group of server nodes are communicatively connected via the LLDP network using the respective per-node remote access controllers.

11. The server system of claim 9, wherein the new security token is a bearer token.

12. The server system of claim 9, wherein the broadcasting is performed by a top of rack switch communicatively connected to the LLDP network.

13. The server system of claim 9, wherein the operations further comprise:
in response to selecting the leader server node, broadcasting the selection of the leader server node, via the LLDP network, to additional server nodes of the interconnected group of server nodes other than the server node.

14. The server system of claim 9, wherein the operations further comprise:
omitting responding to any request for a new security token from other server nodes of the interconnected group that are not the leader server node.

15. The server system of claim 9, wherein the administrator node comprises, or is comprised by, one of the interconnected group of server nodes.

16. A non-transitory machine-readable medium, comprising executable instructions that, when executed by a processor facilitate performance of operations, comprising:
broadcasting, across a link layer discovery protocol (LLDP) network, a selection of one node of a group of nodes as a leader node;
obtaining a request notification for a new security token from the one node of the group of nodes; and
in response to obtaining the request notification, broadcasting, across the LLDP network, the new security token to additional nodes of the group of nodes using a top of rack (TOR) switch connected to the LLDP network.

17. The non-transitory machine-readable medium of claim 16, wherein the operations further comprise:
prior to obtaining the request notification, obtaining, from all nodes of the group of nodes, respective notifications of presence of the nodes via the LLDP network.

18. The non-transitory machine-readable medium of claim 16, wherein the operations further comprise:
obtaining, as part of the request notification for the new security token from the leader node, a proposed bearer token to be employed as the new security token.

19. The non-transitory machine-readable medium of claim 16, wherein the broadcasting is performed by the TOR switch connected to per-node remote access controllers respectively at the nodes of the group of nodes, and wherein the group of nodes comprises the one node and the additional nodes.

20. The non-transitory machine-readable medium of claim 16, wherein the operations further comprise:
requesting a plurality of nodes of the group of nodes, the plurality of nodes comprising the one node, to transmit, via the LLDP network, respective security token requests for respective new security tokens.

* * * * *